United States Patent
Cheng

(10) Patent No.: US 7,515,313 B2
(45) Date of Patent: Apr. 7, 2009

(54) METHOD AND SYSTEM FOR SCANNING WITH ONE-SCAN-AND-DONE FEATURE

(76) Inventor: Stone Cheng, 187 Ping-Teng Rd., Tzu-Kuan Hsiang, Kaohsiung (TW)

(*) Notice: Subject to any disclaimer, the term of this patent is extended or adjusted under 35 U.S.C. 154(b) by 600 days.

(21) Appl. No.: 09/956,118

(22) Filed: Sep. 20, 2001

(65) Prior Publication Data

US 2003/0053147 A1  Mar. 20, 2003

(51) Int. Cl.
H04N 1/04 (2006.01)
H04N 1/40 (2006.01)
H04N 1/387 (2006.01)

(52) U.S. Cl. ............... 358/474; 358/453; 358/448; 358/450

(58) Field of Classification Search ........... 358/474, 358/453, 448, 450, 296
See application file for complete search history.

(56) References Cited

U.S. PATENT DOCUMENTS

| | | | | |
|---|---|---|---|---|
| 4,837,635 A * | 6/1989 | Santos | ............... | 358/401 |
| 5,353,393 A * | 10/1994 | Bennett et al. | ............... | 345/641 |
| 6,559,923 B2 * | 5/2003 | Iwaki | ............... | 355/40 |
| 6,871,243 B2 * | 3/2005 | Iwase et al. | ............... | 710/62 |
| 7,038,713 B1 * | 5/2006 | Matama | ............... | 348/207.2 |
| 7,127,673 B2 * | 10/2006 | Iwata et al. | ............... | 715/517 |
| 2002/0085244 A1 * | 7/2002 | Blasio et al. | ............... | 358/474 |
| 2002/0114021 A1 * | 8/2002 | Lavender et al. | ............... | 358/474 |

* cited by examiner

*Primary Examiner*—Houshang Safaipour
(74) *Attorney, Agent, or Firm*—Stolowitz Ford Cowger LLP

(57) ABSTRACT

In accordance with the present invention, an operating procedure of a scanning system with one-scan-and-done feature is disclosed. The operating procedure comprises steps of receiving parameters input by a user, scanning an original responsive to the parameters, displaying an image corresponding to the original, receiving a portion of the image selected by the user, and outputting the selected image. The present invention can be extended to a scanning method for using a scanning system with one-scan-and-done feature and a scanning system with one-scan-and done feature.

31 Claims, 3 Drawing Sheets

METHOD AND SYSTEM FOR SCANNING WITH ONE-SCAN-AND-DONE FEATURE

BACKGROUND OF THE INVENTION

1. Field of the Invention

The present invention generally relates to a method for scanning an original without scanning the original twice to get an image, and more particularly to a scanning method for providing users with a what you see is what you get (WYSWYG) feature.

2. Description of the Prior Art

The scanning procedure proposed in the prior art comprises basic steps described as steps 11, 12, 13, 14, and 15 shown in FIG. 1. An original is first scanned with a lower resolution to get a first image (step 11). Then, the first image is displayed on a preview window (step 12). A portion of the first image is selected from the preview window (step 13) and a portion of the original corresponding to the selected first image is scanned with a higher resolution to get a second image (step 14). Then, the second image is output (step 15).

Due to the first scan with a resolution lower than that in the second scan, the first image displayed on the preview screen is usually different from the second image. Though an image is not obviously distorted by variations in resolution; the nature of an image, such as color, brightness, spot, and edge of profile, is usually varied with the resolution. The resulting combinations make up the difference between the selected first image shown on the preview window and the output image (such as printed picture or saved file).

Furthermore, when an original is scanned by a scanner to get an image, an image process such as bit enhanced process and color adjustment process is usually performed on the image to enhance the clarity and to promote the quality before the image is output. Due to the different requirement for the first scan and the second scan, the distinction between the selected image shown on the preview window and the output image becomes obvious, especially when a scanner is designed to perform the image process only for the second scan. The image process described herein is usually performed during the scan or after the scan and is restricted to perform automatically, in other words, non-adjustable by users.

In view of the prior art described above, there are differences that can't be overlooked between the image displayed on the preview window and the output image. In short, what a user sees on the preview window is different from what the user thinks he will get. Thus, it is necessary to modify the conventional scanning method to provide users with a what you see is what you get feature.

SUMMARY OF THE INVENTION

In accordance with the present invention, a scanning method and a scanning system for providing users with a what you see is what you get feature are provided.

It is another object of this invention that a scanning method and a scanning system with one-scan-and-done feature are provided.

It is a further object of this invention that a method for adjusting the image process by users during the scanning procedure is provided.

In accordance with the present invention, an operating procedure of a scanning system with one-scan-and-done feature is disclosed. The operating procedure comprises steps of receiving parameters input by a user, scanning an original responsive to the parameters, displaying an image corresponding to the original, receiving a portion of the image selected by the user, and outputting the selected image.

In accordance with the present invention, in another embodiment, a method for using a scanning system with one-scan and-done feature is provided. The method comprises steps of inputting parameters to the scanning system, using the scanning system to scan an original, receiving an image displayed by the scanning system corresponding to the original, selecting a portion of the image, and output the selected image from the scanning system.

In accordance with the present invention, in a further embodiment, a scanning system with one-scan-and done feature is provided. The scanning system comprises a receiving module, a scanning module, a display module, and an output module. The receiving module is for receiving parameters input by a user. The scanning module is for scanning an original responsive to the parameters received by the receiving module. The display module is for displaying an image generated by the scanning module in the scan of the original. The output module is for outputting a selected image selected from the image displayed by the displayed module.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

The drawbacks of the prior art are mostly induced from the different resolutions between the first scan and the second scan and the implementation of the image process in the second scan. Thus, the key aspect of the present invention is to scan an original with a resolution requested by users and to accomplish the performance of the image process to generate a processed image with desired resolution, which is displayed on a preview window. Then, a portion of the processed image is selected and output directly without further scanning actions to ensure the output image is the processed image selected by users.

Figure 1:
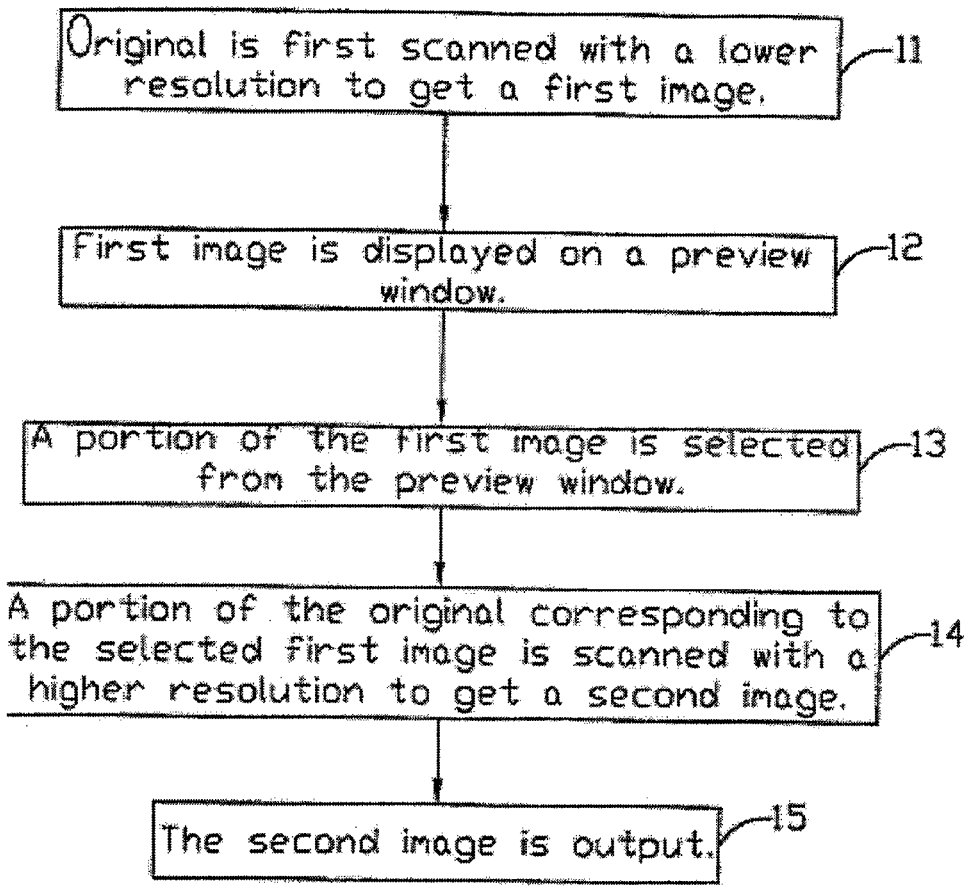
FIG. 1 is a diagram of scanning procedure in the prior art.
Figure 2A:
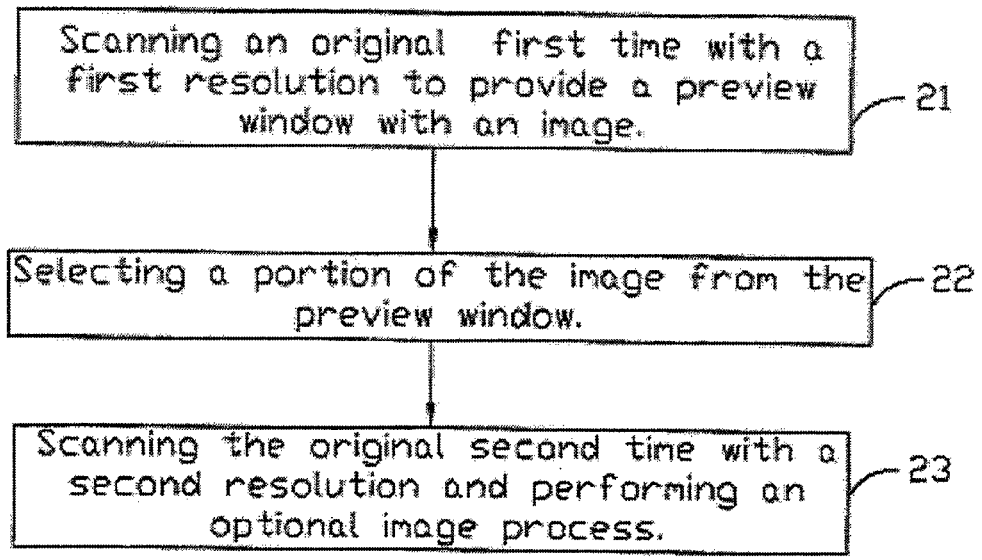
FIGS. 2A and 2B are flow diagrams of a conventional scanning method and a scanning method with one-scan-and-done feature in accordance, respectively.
Figure 2B:
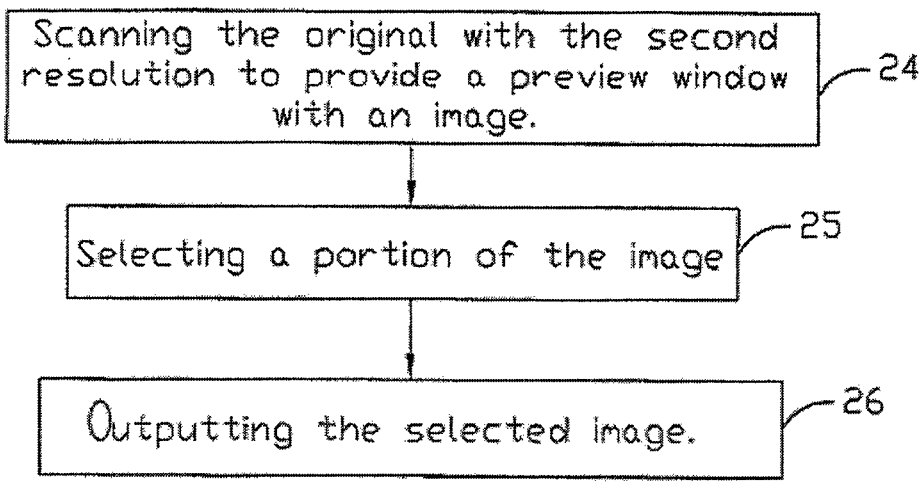

Referring to FIG. 2A and FIG. 2B, a conventional scanning method includes steps 21, 22, and 23 while the scanning method in accordance with the present invention comprises steps 24, 25, and 26. A conventional scanning method, including the steps is provided. Originals first time are scanned with a first resolution to provide a preview window with an image (step 21). A portion of the image is selected from the preview window (step 22). Scan the original a second time with a second resolution and perform an optional image process to get a processed image (step 23). In comparison with the conventional method, the present invention comprises steps of directly scanning the original with the second resolution and performing an optional image process to provide a preview window with a processed image (step 24), selecting a portion of the processed image (step 25), and outputting the selected image (step 26).

As it is apparent, the present invention combines the first scan and the second scan to perform only one scan to generate the preview window. There is no second scan performed after the processed image is selected. Thus, the image shown on the preview window or the processed image selected is what the user gets in the output image. In other words, the present invention provides users with a what you see is what you get feature unless the resolution of screen is too low to precisely display the preview window.

Moreover, due to the prior art required input by users to obtain the first resolution and the second resolution, there is no difficulty in implementing the present invention. The resolution (the second resolution) used to scan an original can be input by users depending on personal experience and the image they wish to get. Thus, the desired resolution and image is acquired in one scan of the original.

Additionally, the image shown on the preview window is pre-processed by performing an image process (such as bit enhanced technology) to prevent image differences from the preview window different to the output image. Additional advantages also let users select the process mode and parameters used in the image process before the scan is performed. In comparison with the prior art the image process is automatically performed, the present invention provides users more flexible applications.

It is noted that one of the reasons to perform a first scan with lower resolution and a second scan with a higher resolution in the prior art is because the hardware performance is limited to the scan speed of a scanner or the capacity of storing the image in a storage media. As the performance of commercial hardware products continuously progresses, the limitation of hard ware is not an issue anymore. Though the scanning method consumes more scanning time with one scan and requires a larger storage capacity, in accordance with the present invention the application is feasible.

Figure 3:
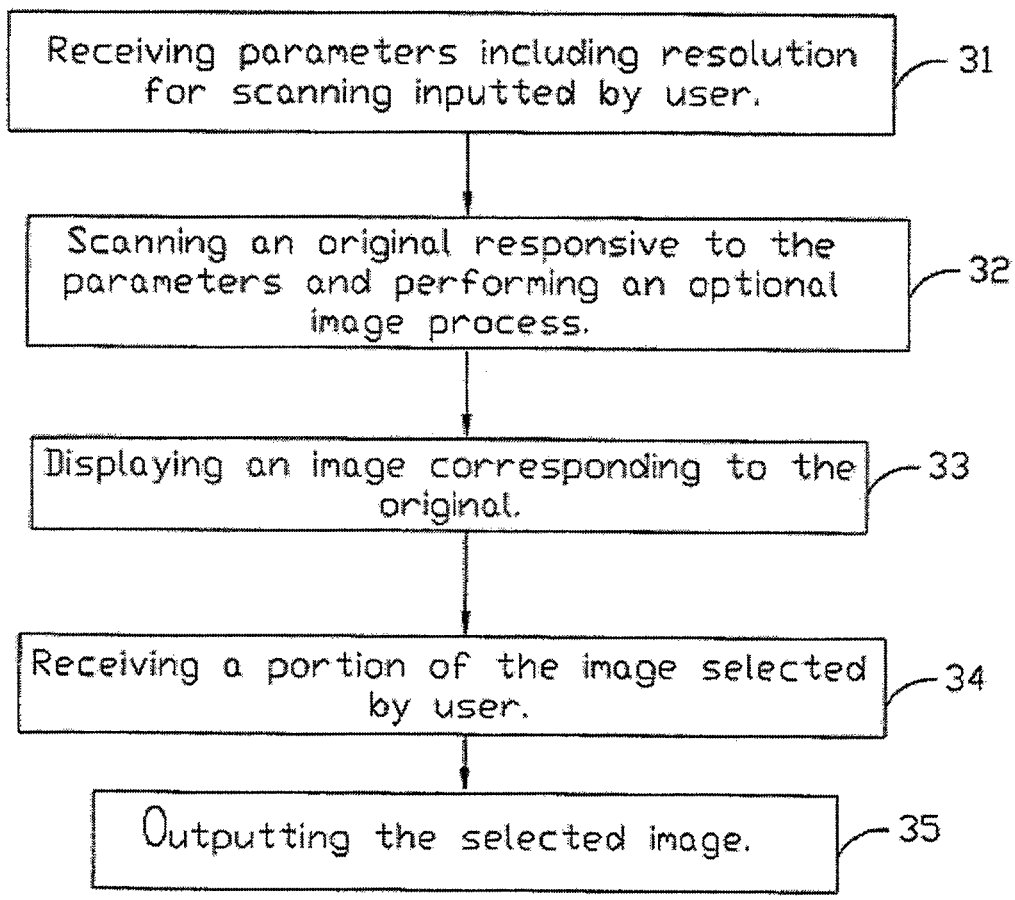
FIG. 3 is an operating procedure in one embodiment.

In accordance with the present invention, in one embodiment, an operating procedure of a scanning system with one-scan-and-done feature is disclosed. The present invention is described in view of the operating procedure of the scanning system in the embodiment. The operating procedure comprises blocks 31, 32, 33, 34, and 35 depicted in FIG. 3.

As shown in receiving block 31, parameters input by a user are received. The parameters comprise the resolution for scanning. As shown in scanning block 32, an original is scanned responsive to the parameters, and also performs an image process on the image. The image process can use any technology to increase the accuracy and the clarity of the image, such as Bit Enhancement Process disclosed in U.S. Pat. No. 5,818,973.

Additionally, the image process can be either performed by a scanner or a computer. The image process can be modified, replaced, or upgraded by external technologies when a computer is utilized. With the prior art a scanner, wherein the image process is fixed when the scanner is once built, performs the image process. In comparison the present invention utilizes a computer by replacing the software the image process is upgraded. Thus, the present invention can promote the flexibility in utilizing the scanner and extend the performance of the scanner.

As depicted in display block 33, an image corresponding to the original is displayed. The image is usually displayed on a screen. The selection or treatment of the image is also handled on the screen. Thus, the performance of the what you see is what you get feature provided by the present invention is diminished if the resolution of the screen is too low.

Referring to receiving block 34, a portion of the image selected by the user is received. It is noted that after the selection of image, a further adjustment of the selected image is achievable. The selected image is output as depicted in block 35.

Figure 4:
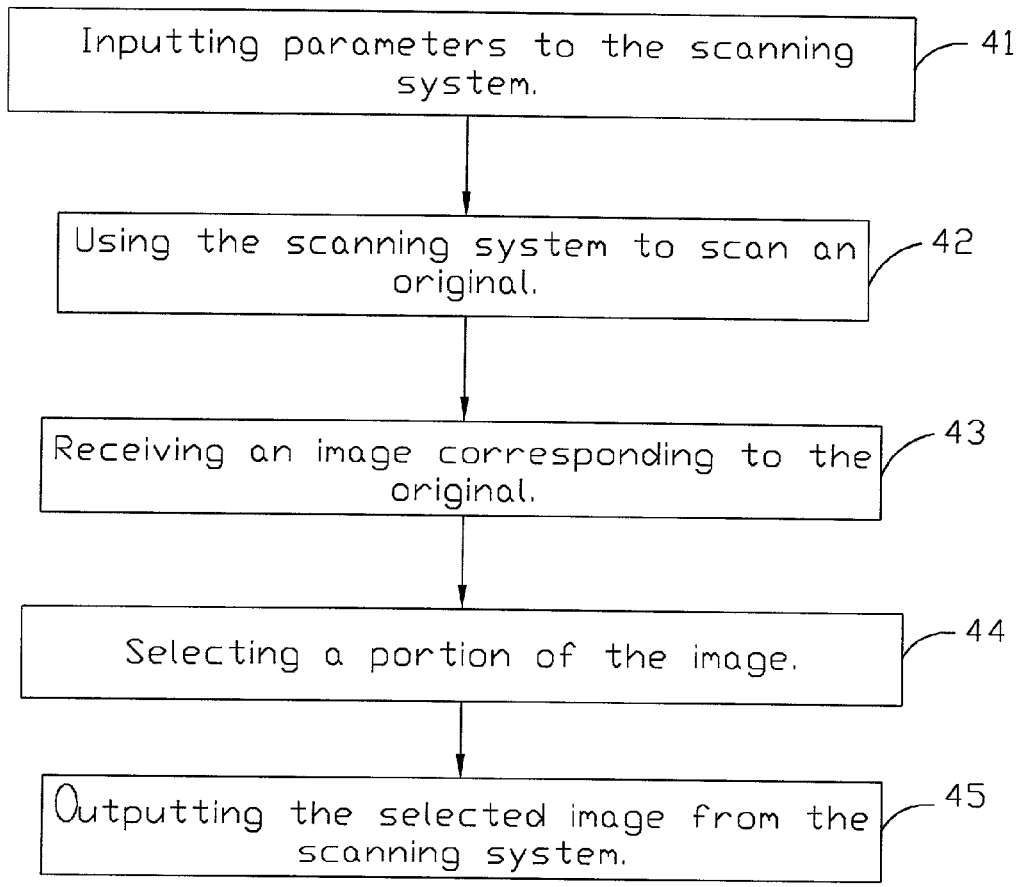
FIG. 4 is an operating procedure in another embodiment.

In accordance with the present invention, in another embodiment, a method for using a scanning system with one-scan and-done feature is provided. The present invention is described in view of using the scanning system in the embodiment. The method comprises steps 41, 42, 43, 44, and 45 illustrated in FIG. 4.

As shown in input block 41, parameters are input to the scanning system. The parameters comprise a resolution for scanning. The parameters further comprise commands of performing an image process; thus the image process is performed prior to displaying the image. The image process can use any technology to increase the accuracy and the clarity of the image, such as Bit Enhancement Process. Additionally, the image process can be performed by a scanner or by a computer. The image process can be modified, replaced, and upgraded by external technologies when a computer is utilized.

Then, the original is scanned by the scanning system, as shown in scanning block 42.

As shown in receiving block 43, an image displayed by the scanning system corresponding to the original is received. The image is usually displayed on a screen. The selection or treatment of the image is also handled on the screen. Thus, the performance of the what you see is what you get feature provided by the present invention is diminished if the resolution of the screen is too low.

A portion of the image is selected, as depicted in processing block 44. It is noted that after the image selection, a further adjustment of the selected image is achievable. The selected image is output from the scanning system, as illustrated in block 45.

Figure 5:
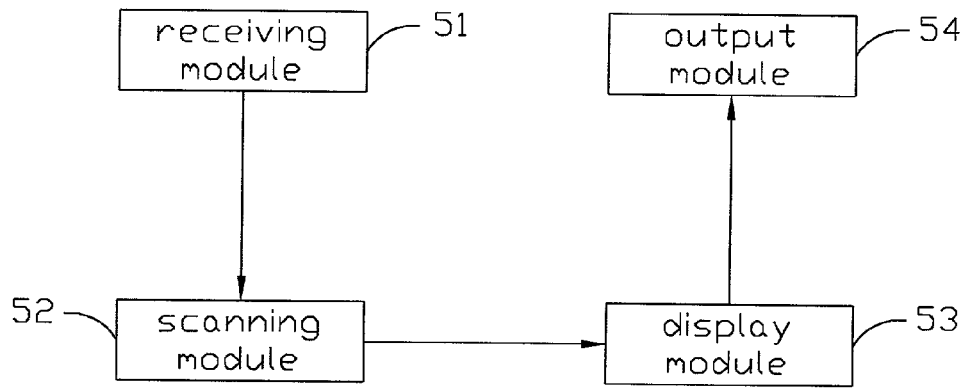
FIG. 5 is a schematic structure in a further embodiment.

In accordance with the present invention, in a further embodiment, a scanning system with one-scan-and done feature is provided. The present invention is described in view of the structure of the scanning system in the embodiment. The scanning system comprises units of receiving module 51, scanning module 52, display module 53, and output module 54 in FIG. 5.

The receiving module 51 is for receiving parameters input by a user. The scanning module 52 is for scanning an original responsive to the parameters received by the receiving module 51. The display module 53 is for displaying an image generated by the scanning module 52 in the scan of the original. The output module 54 is for outputting a selected image selected from the image displayed by the displayed module 53.

Simply, the scanning system is similar to that in the prior art. The key difference is the output module 54. The output module 54 directly outputs the image selected and treated by the scanning module, there is no further scan of the original needed to modify the selected image.

In view of embodiments described above, in accordance with the present invention, a scanning method and a scanning system to provide users with a what you see is what you get feature is provided. The operating procedure is simplified, only one scan is possible with the one-scan-and-done feature.

Furthermore, the resolution for scanning is input by users, the scanning procedure by the scanner is unchanged, and the image process can be similar to that in prior art, thus, there is no need to change the hardware in use. Thus, in accordance with the present invention, the scanning method to provide users with a what you see is what you get feature is achievable with only one scan.

Although specific embodiments have been illustrated and described, it will be obvious to those skilled in the art that various modifications may be made without departing from what is intended to be limited solely by the appended claims.

What is claimed is:

1. A method, comprising:
   receiving at least one scanning resolution request parameter from a user-selectable input that indicates a user-selectable resolution for scanning an original;
   obtaining an image of the original by scanning the original at the user-selectable resolution indicated in the scanning resolution request parameter;
   displaying the scanned image of the original on a screen at a display resolution corresponding with the user-selectable resolution indicated in the at least one scanning resolution request parameter;
   receiving input corresponding to a user-selected portion of the scanned image, wherein the user-selected portion comprises less of the original than the scanned image displayed on the screen; and
   outputting the portion of the scanned image at substantially the same resolution as the scanned image is displayed on the screen without performing a further scanning action, and wherein the entire scanned image is not output.

2. The method of claim 1, further comprising:
   receiving a second request parameter from the user-selectable input that indicates a user-selected process mode; and
   automatically pre-processing the scanned image responsive to the user-selected process mode prior to displaying the image on the screen to prevent perceived differences between the displayed image on the screen and the outputted image.

3. The method of claim 1, further comprising scanning the original in response to receiving the at least one scanning resolution request parameter so that the resolution of the displayed image is acquired in a single scan of the scanned original.

4. The method of claim 3, further comprising:
   scanning the original at a selected high resolution identified in the at least one scanning resolution request parameter to obtain a high resolution image, wherein a resolution of the screen is lower than the selected high resolution.

5. The method of claim 3, further comprising using a scanner to modify the displayed image.

6. The method of claim 3, further comprising using a computer to modify the displayed image.

7. The method of claim 1, further comprising pre-processing the portion of the image prior to displaying the image.

8. A method comprising:
   scanning an original at a resolution identified in a selectable scanning resolution request parameter related to one of multiple different scanning resolutions for a scanning system;
   displaying an image corresponding to the original scanned by the scanning system at the identified resolution, wherein the image of the original is displayed on a screen; and
   outputting a portion of the scanned image from the scanning system at the same resolution used for scanning and displaying the image without performing an additional scanning operation on the original, wherein the portion of the scanned image is selected by a user from the displayed image on the screen, and wherein the portion comprises less of the original than the scanned image displayed on the screen.

9. The method of claim 8, further comprising:
   receiving a request for an image process on the image; and
   performing the image process on the image prior to displaying the image so that the displayed image resolution more accurately represents the resolution of the image output by the scanning system.

10. The method of claim 9, wherein the image process comprises a bit enhanced process.

11. The method of claim 9, wherein the image process is performed by a scanner.

12. The method of claim 9, wherein the image process is performed by a computer.

13. A scanning system comprising:
    a receiving module capable of receiving at least one scanning parameter from a user-selectable input that identifies one of multiple different selectable resolutions for scanning an original;
    a scanning module capable of scanning the original at the identified resolution in response to the at least one scanning parameter;
    a display module capable of displaying an image generated by the scanning module at substantially the same resolution used for scanning the original;
    a processing module capable of receiving input associated with a portion of the displayed image; and
    an output module capable of directly outputting the portion of the displayed image without the scanning module performing an additional scanning operation, wherein the output portion has substantially the same resolution as the displayed image.

14. The apparatus of claim 13, wherein the receiving module is capable of receiving input from a user selecting an image processing operation to be performed on the scanned image.

15. The apparatus of claim 13, wherein the receiving module is capable of receiving input from a user selecting a portion of the scanned image to be output by an output module.

16. The apparatus of claim 13, wherein the receiving module is capable of receiving the scanning parameter from a user.

17. An apparatus, comprising:
    means for receiving at least one scanning resolution request parameter from a user-selectable input that indicates a user-selectable resolution for scanning an original;
    means for obtaining an image of the original by scanning the original at the user-selectable resolution indicated in the scanning resolution request parameter;
    means for displaying the scanned image of the original at a display resolution corresponding with the user-selectable resolution;
    means for receiving input associated with a portion of the scanned image, wherein the portion comprises less of the original than the scanned image; and
    means for outputting the portion of the scanned image at the same resolution as the displayed image without performing an additional scanning operation, and wherein the entire displayed image is not output.

18. The apparatus of claim 17, further comprising:
means for receiving a user-selectable image process parameter from the user-selectable input; and
means for pre-processing the scanned image in response to receiving the user-selectable image process parameter to prevent differences between the displayed image and the outputted image.

19. The apparatus of claim 18, further comprising:
means for scanning the original in response to receiving the user-selectable image process parameter so that the resolution of the outputted image is acquired in a single scan of the original.

20. The apparatus of claim 17, further comprising means for using a bit enhanced process to modify the displayed image.

21. The apparatus of claim 17, further comprising means for adjusting a portion of the image selected by the user prior to outputting the selected portion of the image.

22. A computer readable medium having instructions stored thereon, wherein when the instructions are executed by at least one device, they are operable to:
receive at least one scanning resolution request parameter from a user-selectable input that indicates a user-selectable resolution for scanning an original;
obtain an image of the original by scanning the original at the user-selectable resolution indicated in the scanning resolution request parameter, wherein the scanning operation is performed without performing a preview scan;
display the scanned image of the original on a screen at a display resolution corresponding with the user-selectable resolution indicated in the scanning resolution request parameter, wherein the scanned image comprises the entire original;
receive input corresponding to a selected portion of the image, wherein the selected portion of the image comprises less of the original than the scanned image displayed on the screen; and
output the selected portion of the image at the same resolution used for displaying the image on the screen without performing an additional scanning operation.

23. The computer readable medium of claim 22, wherein the instructions are further operable to:
receive an image process parameter from the user-selectable input; and
pre-process the image displayed on the screen in response to receiving the image process parameter to prevent differences between the image displayed on the screen and the output portion of the image.

24. The computer readable medium of claim 22, wherein the instructions are further operable to:
identify a user-selectable bit enhancement operation of the scanned image; and
process the scanned image according to the bit enhancement operation prior to displaying the scanned image.

25. The method according to claim 8, wherein the entire scanned image is not output.

26. The scanning system of claim 13, wherein the portion of the displayed image is a user-selected portion.

27. The apparatus of claim 17, wherein the portion of the scanned image is a user-selected portion of the scanned image.

28. The method according to claim 1, further comprising:
identifying a user-selectable bit enhancement operation of the scanned image; and
processing the scanned image according to the bit enhancement operation prior to displaying the scanned image.

29. The method according to claim 8, further comprising:
identifying a user-selectable bit enhancement operation of the scanned image; and
processing the scanned image according to the bit enhancement operation prior to displaying the scanned image.

30. The scanning system according to claim 13 wherein the receiving module is further capable of:
identifying a user-selectable bit enhancement operation of the scanned image; and
processing the scanned image according to the bit enhancement operation prior to displaying the scanned image.

31. The apparatus according to claim 17, further comprising:
means for identifying a user-selectable bit enhancement operation of the scanned image; and
means for processing the scanned image according to the bit enhancement operation prior to displaying the scanned image.

* * * * *

UNITED STATES PATENT AND TRADEMARK OFFICE
CERTIFICATE OF CORRECTION

| | |
|---|---|
| PATENT NO. | : 7,515,313 B2 |
| APPLICATION NO. | : 09/956118 |
| DATED | : April 7, 2009 |
| INVENTOR(S) | : Cheng |

Page 1 of 1

It is certified that error appears in the above-identified patent and that said Letters Patent is hereby corrected as shown below:

Title page item [57]
At the abstract, line 10, please replace "and done" with --and-done--.
At column 8, line 30, please replace "claim 13 wherein" with --claim 13, wherein--.

Signed and Sealed this

Eleventh Day of May, 2010

David J. Kappos
*Director of the United States Patent and Trademark Office*